Patented Oct. 20, 1942

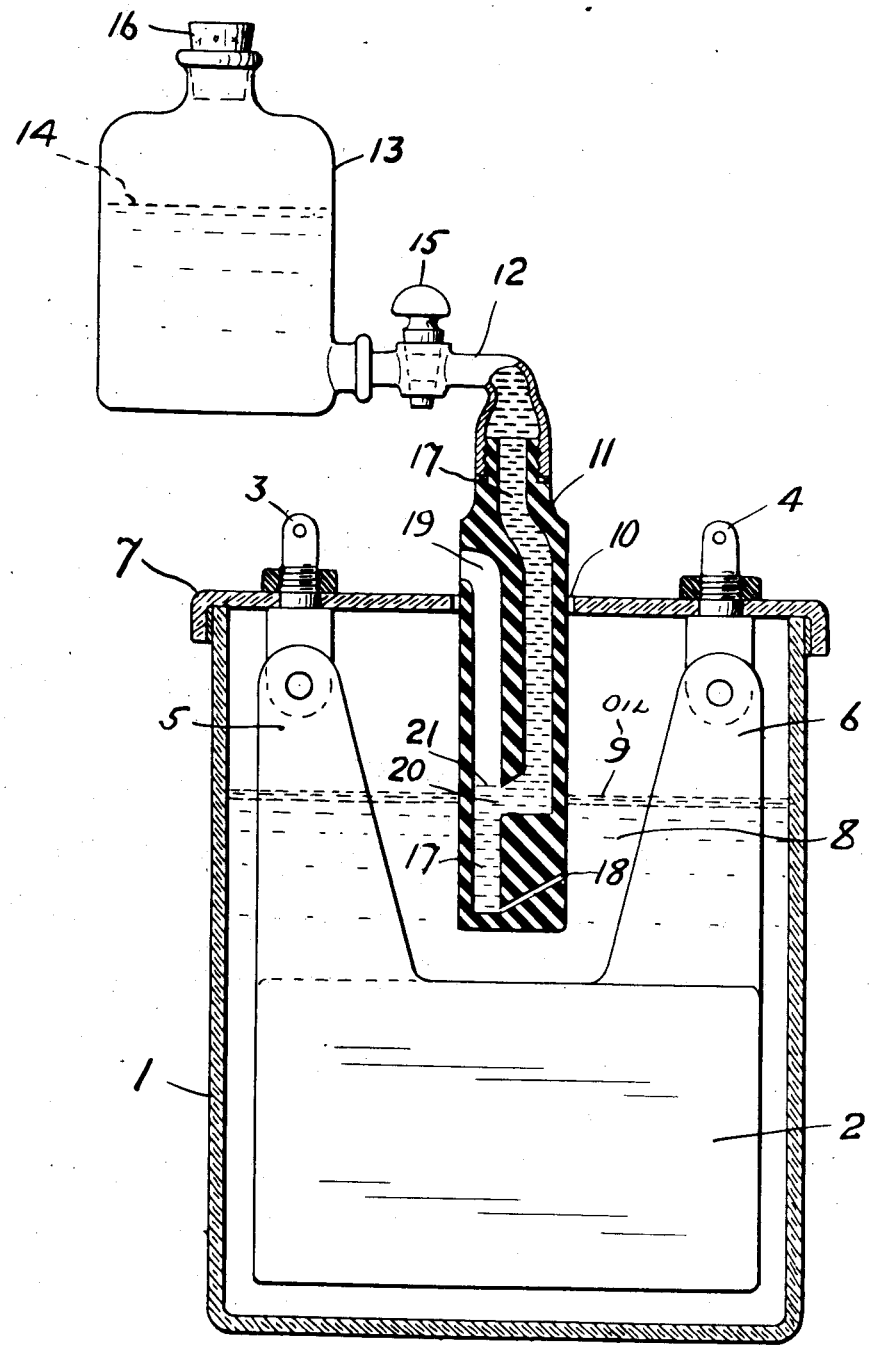

2,299,545

UNITED STATES PATENT OFFICE 2,299,545

AUTOMATIC FILLING DEVICE FOR ELECTROLYTIC CELLS

Ray Jardine, Glenside, Pa., assignor to The Electric Storage Battery Company, Philadelphia, Pa., a corporation of New Jersey Application January 12, 1940, Serial No. 313,567

5 Claims. (Cl. 136—162)

This device is designed to maintain the electrolyte level in an electrolytic cell at a substantially constant point and is especially adapted for application to a cell in which a layer of oil is provided on the surface of the electrolyte to minimize evaporation and to prevent contact with the air. It is herein described as applied to a counter electromotive force cell in which the electrodes are of nickel or an alloy containing nickel and in which the electrolyte is a solution of caustic alkali such as sodium hydroxide. It is customary in such a cell to provide a layer of mineral oil on the surface of the electrolyte to prevent evaporation and to prevent the contamination of the electrolyte by combination with the carbon dioxide in the air. Since the water in the electrolyte is constantly decomposed into oxygen and hydrogen whenever the cell is in service carrying current, it is important to provide automatic means for replacing the water thus decomposed in order to minimize the attendance otherwise required for filling the cell.

Automatic filling means have been employed for this purpose for ordinary electrolytic cells in which a reservoir, hermetically sealed, located above the cell, is provided with a discharge tube extending downwardly to the desired electrolyte level. So long as the electrolyte level is above the mouth of this tube, water will not flow from the reservoir by reason of the partial vacuum in the reservoir above the level of the water. As soon as the electrolyte level in the cell drops below the mouth of the tube, air will be admitted into the reservoir, permitting a corresponding amount of water to discharge into the cell until the level rises sufficiently to seal the mouth of the tube.

Where there is a layer of oil on the surface of the electrolyte, this device cannot be used since the oil will rise in the discharge tube and finally be transferred to the reservoir.

The device of the present invention obviates this difficulty by providing a discharge duct leading from the reservoir to a point in the cell appreciably below the layer of oil and a passage for the admission of air to the discharge duct at a point corresponding to the desired electrolyte level.

The oil is therefore kept entirely out of contact with the liquid supplied from the reservoir.

The invention will be more readily understood by reference to the accompanying drawing in which the single figure shows, partly in vertical elevation and partly in section, the filling device applied to a nickel alkaline counter E. M. F. cell.

In the drawing 1 is the container of the counter E. M. F. cell in which electrodes 2 are alternately connected to the cell terminals 3 and 4, respectively, by means of the plate lugs 5 and 6. Terminals 3 and 4 are clamped to the cover 7. 8 is the alkaline electrolyte covered by a layer of oil 9. Through the opening 10 in the cover there is introduced the filling structure 11 whose lower end projects into the electrolyte below the layer of oil and whose upper end is connected through the duct 12 to the reservoir 13 which contains a body of water 14. A stop-cock 15 is provided to prevent the escape of water when the stopper 16 is removed while the reservoir is being filled.

The filling structure or enclosure 11 is shown as rectangular and oblong in form and it is made of inert material such as "Lucite." The structure is provided with a discharge duct 17 communicating at the top with the reservoir 13 and at the bottom through the restricted passage 18 with the electrolyte in the cell below the layer of oil. A passage 19 is also provided communicating at the top with the atmosphere and below through the orifice 20 with the discharge duct 17.

Under operating conditions the discharge duct 17 is filled with water from the reservoir 13, and this water will rise in the air passage 19 to the level indicated at 21, thus preventing the access of air to the discharge duct 17. Equilibrium will be established between the liquid in the discharge duct 17 below the level 21 and the electrolyte in the cell when the weight of the column of electrolyte and oil above the orifice 18 is equal to the weight of water in the discharge duct 17 between the orifice 18 and the level 21. In the illustration here shown, since the specific gravity of the alkaline electrolyte is somewhat greater than unity and the specific gravity of the layer of oil is somewhat less than unity, and the height of the column of electrolyte is greater than the layer of oil, the combined weight of the two will be somewhat greater than that of an equal height of water and the level 21 will therefore be somewhat above the top of the layer of oil for conditions of equilibrium. As soon, however, as the electrolyte level drops below this point, the level 21 will drop by a corresponding amount, admitting a bubble of air into the reservoir 13 through the discharge duct 17, which will permit a corresponding amount of water to flow from the reservoir via the discharge duct 17 through the passage 18 into the cell, thus restoring the electrolyte level to the normal point.

The passage 18 slopes upwardly from the lower end of the duct 17 in order to prevent bubbles of gas which rise from the electrodes from entering the discharge duct. The upper surface of the orifice 20 slopes upwardly from the air passage 19 in order to permit bubbles of air to pass up into the discharge duct 17 when the level 21 falls.

It will be obvious to those skilled in the art to which the invention relates that modifications may be made in details of construction and arrangement and in matters of mere form without departing from the spirit of the invention which is not limited in respect to such matters or otherwise than as the appended claims may require.

I claim:

1. An automatic filling device comprising in combination an electrolytic cell having a layer of oil floating on the surface of its electrolyte, a sealed reservoir above said cell, a fluid discharge duct leading from the lower portion of said reservoir and having a discharge opening lying within said cell below said layer of oil, and an air duct communicating with said discharge duct at a point substantially corresponding to the desired electrolyte level to be maintained in said cell, said air duct having an air inlet opening near the top of said cell above the maximum level of said oil layer on said electrolyte whereby automatic filling of said cell is effected without diffusion of said oil in the filling fluid.

2. An automatic filling device for an electrolytic cell of the type having a layer of oil floating on the surface of its electrolyte, comprising, a closed reservoir, a discharge duct depending from said reservoir, and an enclosure adapted to extend into said cell so that its lower portion lies below the oil layer on the electrolyte, said enclosure having a fluid passageway connected to said discharge duct, an air passageway communicating with said fluid passageway intermediate its ends, a fluid outlet for said fluid passageway in said lower portion of said enclosure, a fluid inlet for said fluid passageway in the upper end of said enclosure, and an air inlet for said air passageway lying near said fluid inlet but out of communication therewith so that fluid may be supplied to said cell without diffusion of the oil on the surface of the electrolyte with the fluid being supplied.

3. An automatic filling device for a covered electrolytic cell of the type having a layer of oil floating on the surface of its electrolyte, comprising, a reservoir adapted to lie above said cell, an outlet in the lower portion of said reservoir, a discharge duct communicating at its top with said reservoir outlet and having at its bottom a restricted passage through which it is adapted to communicate with the electrolyte in said cell below the layer of oil, and an air duct connected to said discharge duct intermediate the ends of said duct so that the sealing and unsealing of the connection between said air duct and said discharge duct by the change of fluid level in said cell regulates the flow of fluid from said reservoir to said cell, said air duct having an inlet adapted to lie near the top of said cell above the maximum level reached by said oil layer during the operation of said cell whereby diffusion of oil into the fluid reservoir is prevented.

4. Means for automatically introducing liquid to the electrolyte of an electrolytic cell comprising, an oblong body of insulating material having a liquid discharge duct passing through said body in a substantially axial direction, the inlet for said duct opening through the top of said body and the outlet for said duct opening in a side of said body adjacent the bottom thereof, said body also having an air passage passing therethrough in a substantially axial direction, said passage opening at one end through said body adjacent the top and communicating at the other end with said duct intermediate the ends of said duct and within the interior of said body.

5. Automatic filling means for an electrolytic cell of the type having a layer of oil floating on the surface of the electrolyte thereon, comprising, a sealed reservoir, a fluid discharge duct leading from the lower portion of said reservoir and having a discharge opening adapted to lie below the oil layer on the electrolyte of said cell, and an air duct having one end communicating with said discharge duct at substantially the point above said discharge opening at which the electrolyte level in said cell is to be maintained and its opposite end open to the atmosphere above said point of communication between said lower end and said discharge duct, whereby the diffusion of oil in the fluid in said reservoir during the operation of said automatic filling means is prevented.

RAY JARDINE.